US012714638B2

(12) United States Patent
Wu

(10) Patent No.: US 12,714,638 B2
(45) Date of Patent: Aug. 25, 2026

(54) HAND-HELD MASSAGE MACHINE

(71) Applicant: SHENZHEN VINCENT TECHNOLOGY CO., LTD, Shenzhen (CN)

(72) Inventor: Chengfeng Wu, Shenzhen (CN)

(73) Assignee: SHENZHEN VINCENT TECHNOLOGY CO., LTD, Shenzhen (CN)

(*) Notice: Subject to any disclaimer, the term of this patent is extended or adjusted under 35 U.S.C. 154(b) by 636 days.

(21) Appl. No.: 18/200,009

(22) Filed: May 22, 2023

(65) Prior Publication Data

US 2024/0225954 A1 Jul. 11, 2024

Related U.S. Application Data

(63) Continuation of application No. PCT/CN2023/082319, filed on Mar. 17, 2023.

(30) Foreign Application Priority Data

Jan. 10, 2023 (CN) ......................... 202310031925.1

(51) Int. Cl.
*A61H 23/02* (2006.01)

(52) U.S. Cl.
CPC ..... *A61H 23/0254* (2013.01); *A61H 23/0263* (2013.01); *A61H 2201/0153* (2013.01);
(Continued)

(58) Field of Classification Search
CPC .............. A61H 23/0254; A61H 23/006; A61H 23/0263; A61H 23/00–06;
(Continued)

(56) References Cited

U.S. PATENT DOCUMENTS

2002/0161315 A1* 10/2002 Harris ................ A61H 23/0254 601/111
2003/0028134 A1* 2/2003 Lev .................... A61H 23/0263 601/111

(Continued)

FOREIGN PATENT DOCUMENTS

CN 110538062 A 12/2019
CN 111989076 A 11/2020

(Continued)

OTHER PUBLICATIONS

KR 20110045877 machine translation (Year: 2011).*
TW M605090 U machine translation (Year: 2020).*
EP 1649845 A1 machine translation (Year: 2006).*

*Primary Examiner* — Brandy S Lee
*Assistant Examiner* — Sara K Toich
(74) *Attorney, Agent, or Firm* — Ming Jiang; OPENPTO US LLC

(57) ABSTRACT

A hand-held massage machine includes a handle; a massage unit mounted on the handle by means of a telescopic shaft; a power source; and a transmission mechanism, where a counterweight portion is mounted on the transmission mechanism, and the counterweight portion is linked to the transmission mechanism so as to increase force output by the transmission mechanism to the telescopic shaft. By means of the above structure, the telescopic shaft in the hand-held massage machine can obtain larger telescopic force, and the scale and the generation probability of lateral deviation of a massage unit and the telescopic shaft in a telescopic process are smaller, such that vibration and noise generated due to lateral deviation in the telescopic process of the massage unit are reduced.

15 Claims, 9 Drawing Sheets

(52) U.S. Cl.
CPC ................ *A61H 2201/0169* (2013.01); *A61H 2201/1463* (2013.01)

(58) Field of Classification Search
CPC .... A61H 2201/0153; A61H 2201/0169; A61H 2201/18; A61H 2201/12–123; A61H 2201/1436–1463; A61H 19/44; A61H 19/00–50; A61H 2205/087
See application file for complete search history.

(56) References Cited

U.S. PATENT DOCUMENTS

| | | | | |
|---|---|---|---|---|
| 2010/0010399 | A1* | 1/2010 | Siebert, Jr. | A61H 19/00 601/105 |
| 2015/0148592 | A1* | 5/2015 | Kanbar | A61H 19/34 600/38 |
| 2017/0156974 | A1* | 6/2017 | Griner | A61H 23/006 |
| 2019/0247271 | A1* | 8/2019 | Lee | A61H 23/006 |

FOREIGN PATENT DOCUMENTS

| | | | | | |
|---|---|---|---|---|---|
| CN | 112087097 | A | | 12/2020 | |
| CN | 215021992 | U | | 12/2021 | |
| EP | 1649845 | A1 | * | 4/2006 | A61H 23/02 |
| JP | H0447439 | U | | 4/1992 | |
| KR | 20110045877 | A | * | 5/2011 | A61H 23/0263 |
| TW | M605090 | U | * | 12/2020 | |

* cited by examiner

HAND-HELD MASSAGE MACHINE

CROSS REFERENCE TO THE RELATED APPLICATIONS

This application is the continuation application of International Application No. PCT/CN2023/082319, filed on Mar. 17, 2023, which is based upon and claims priority to Chinese Patent Application No. 202310031925.1, filed on Jan. 10, 2023, the entire contents of which are incorporated herein by reference.

TECHNICAL FIELD

The present disclosure belongs to the technical field of massage instruments, and particularly relates to a hand-held massage machine.

BACKGROUND

A massage machine is an instrument which converts electric energy into mechanical energy and generates vibration to massage the human body, and owing to the advantages of being convenient to take and use, a hand-held massage machine has become more and more popular with users. However, an existing hand-held massage machine has the defect of large noise during use.

It is found through research that in the existing hand-held massage machine, output force of a driving assembly for driving a massage unit to stretch out and draw back is insufficient, that is, telescopic force of the massage unit is not enough. In a no-load state (that is, when the massage unit is not in contact with the human body), the massage unit translates along a design path without lateral deviation. In a full-load state (that is, when the massage unit massages the human body), although the massage unit can stretch out and draw back along the design path, lateral deviation is likely to be generated in a telescopic process, such that extra vibration and noise are generated.

An electric motor is an economical and reliable power output component, and when the electric motor is used as a driving unit of the telescopic massage machine, rotational motion of the electric motor needs to be converted into reciprocating telescopic motion of the massage unit. Generally, for the massage unit moving in a reciprocating manner, in order to improve massage effect, weight of a moving portion of the massage unit needs to be optimized. Generally, inertia brought by the weight of the massage unit is used for increasing force output effect of the massage. However, in the process in which the electric motor drives the massage unit to reciprocate, inertia of the massage unit is a parameter which hinders motion reversing of the massage unit, that is, the increased mass of the massage unit will hinder the massage unit from reversing, resulting in that such a hindering effect will eventually act on an electric motor end for driving after an action of a transmission system. In this structure, if there is a gap in a transmission component (there is necessarily a difference in reality), a collision between the transmission structural members can be formed in a reversing process, thereby generating noise.

In engineering practice, in order to eliminate the noise and improve properties of products, one of the common solutions is to use a vibration-absorbing and sound-insulating material. However, a type of massage products need to satisfy requirements for both a telescopic action and high-frequency vibration of the massage unit, and the used vibration-absorbing and sound-insulating material will also absorb the high-frequency vibration that generates an active massage effect, thereby reducing the properties of the products.

SUMMARY

The present disclosure provides a hand-held massage machine so as to solve the technical problem that a hand-held massage machine in the prior art generates large noise during use.

The present disclosure is achieved through the technical solutions as follows: a hand-held massage machine includes:

- a handle;
- a massage unit mounted on the handle by means of a telescopic shaft;
- a power source mounted in the handle; and
- a transmission mechanism being in transmission connection between the power source and the telescopic shaft so as to drive the telescopic shaft to stretch out and draw back on the handle, where
- the transmission mechanism is provided with a counterweight portion, and the counterweight portion is linked to the transmission mechanism.

Further, in order to implement the present disclosure better, the transmission mechanism includes:

- a connecting rod, one end of which is hinged to the telescopic shaft;
- a rotating block being rotationally mounted inside the handle by means of a rotating shaft, the rotating block being provided with a hinge shaft, the hinge shaft being eccentrically arranged relative to the rotating shaft, and the other end of the connecting rod being hinged to the rotating block by means of the hinge shaft; and
- a speed reduction assembly being in transmission connection between the power source and the rotating block so as to drive the rotating block to rotate around the rotating shaft, where
- the counterweight portion is fixedly connected to the rotating block.

Further, in order to implement the present disclosure better, the counterweight portion and the rotating block are integrally formed, and the counterweight portion and the hinge shaft are located on two sides of the rotating shaft respectively.

Further, in order to implement the present disclosure better, the speed reduction assembly includes:

- a worm wheel rotationally mounted inside the handle by means of a circular shaft;
- a worm connected to a power output end of the power source, where the worm wheel is meshed with the worm; and
- a transmission pair being in transmission connection between the circular shaft and the rotating shaft.

Further, in order to implement the present disclosure better, the transmission pair includes:

- a driving pulley mounted on the circular shaft;
- a driven pulley mounted on the rotating shaft; and
- a belt connected between the driving pulley and the driven pulley, where the belt, the driving pulley and the driven pulley form belt transmission.

Further, in order to implement the present disclosure better, the transmission pair includes:

- a driving gear mounted on the circular shaft; and
- a driven gear mounted on the rotating shaft, where the driven gear is meshed with the driving gear.

Further, in order to implement the present disclosure better, a weight ratio of the counterweight portion to the massage unit is n:1, where 0.6≤n≤2.

Further, in order to implement the present disclosure better, a weight ratio of the counterweight portion to the massage unit is n:1, where 1≤n≤2.

Further, in order to implement the present disclosure better, a weight ratio of the counterweight portion to the massage unit is n:1, where n=1.5.

Further, in order to implement the present disclosure better, the massage unit is provided with a soft rubber sleeve in a sleeving manner.

Compared with the prior art, the present disclosure has the following beneficial effects:

The hand-held massage machine provided by the present disclosure includes the handle, the massage unit, the power source, the transmission mechanism and the counterweight portion, where the massage unit is mounted on the handle by means of the telescopic shaft, the power source is mounted in the handle, and the transmission mechanism is in transmission connection between the power source and the telescopic shaft. The transmission mechanism is used for transmitting power of the power source to the telescopic shaft to drive the telescopic shaft to drive the massage unit to stretch out and draw back on the handle, the counterweight portion is mounted on the transmission mechanism, and the counterweight portion is linked to the transmission mechanism, such that the force output by the transmission mechanism to the telescopic shaft is increased.

For the above structure, the transmission mechanism is in transmission connection between the power source and the telescopic shaft, such that the power source drives the transmission mechanism to operate. The counterweight portion is mounted on the transmission mechanism and is linked to the counterweight portion, such that when the transmission mechanism operates, the counterweight portion is also driven to act synchronously. The counterweight portion equivalently increases a weight of the transmission mechanism, such that after the counterweight portion is additionally mounted in the hand-held massage machine provided by the present disclosure, the transmission mechanism and the counterweight portion synchronously output energy to the telescopic shaft during operation, the energy obtained by the telescopic shaft in unit time is larger, the strength of the telescopic shaft in a telescopic process is larger, and the telescopic strength of the massage unit is also larger. When the massage unit applies massage to the human body, due to the fact that the massage unit may stretch out and draw back with larger force, the scale and the generation probability of lateral deviation of the massage unit and the telescopic shaft in the telescopic process are smaller, such that vibration and noise generated due to lateral deviation in the telescopic process of the massage unit are reduced.

BRIEF DESCRIPTION OF THE DRAWINGS

In order to more clearly describe the technical solutions in the examples of the present disclosure or in the prior art, a brief introduction to the accompanying drawings required for the description of the examples or the prior art will be provided below. Obviously, the accompanying drawings in the following description are merely some example of the present disclosure. Those of ordinary skill in the art can also derive other accompanying drawings from these accompanying drawings without making inventive efforts.

IN THE FIGURES

Figure 1:
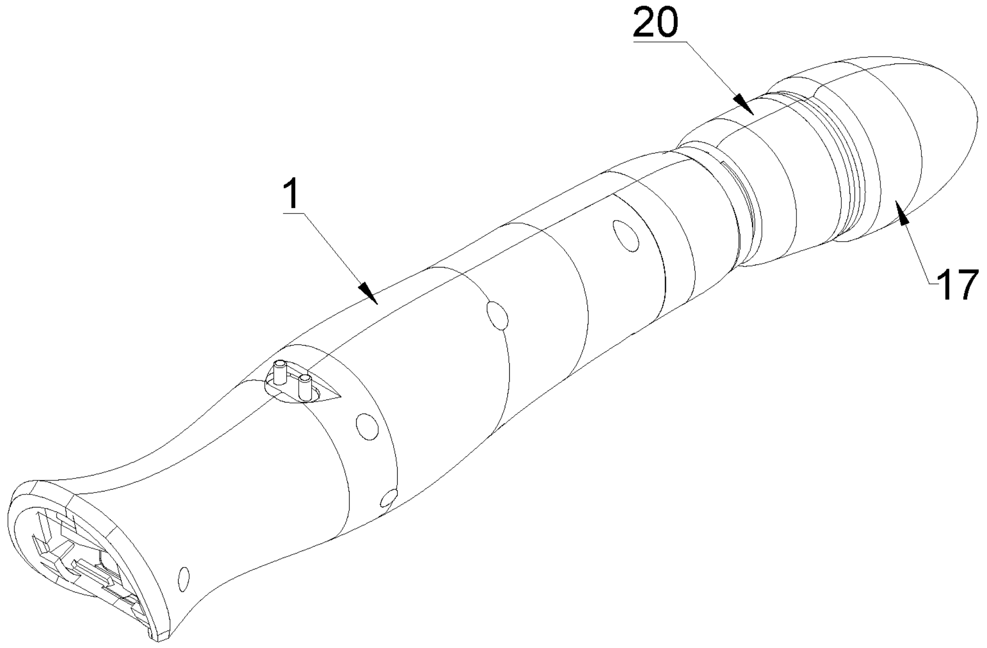
FIG. 1 is a schematic structural diagram of a hand-held massage machine provided by the present disclosure.
Figure 2:
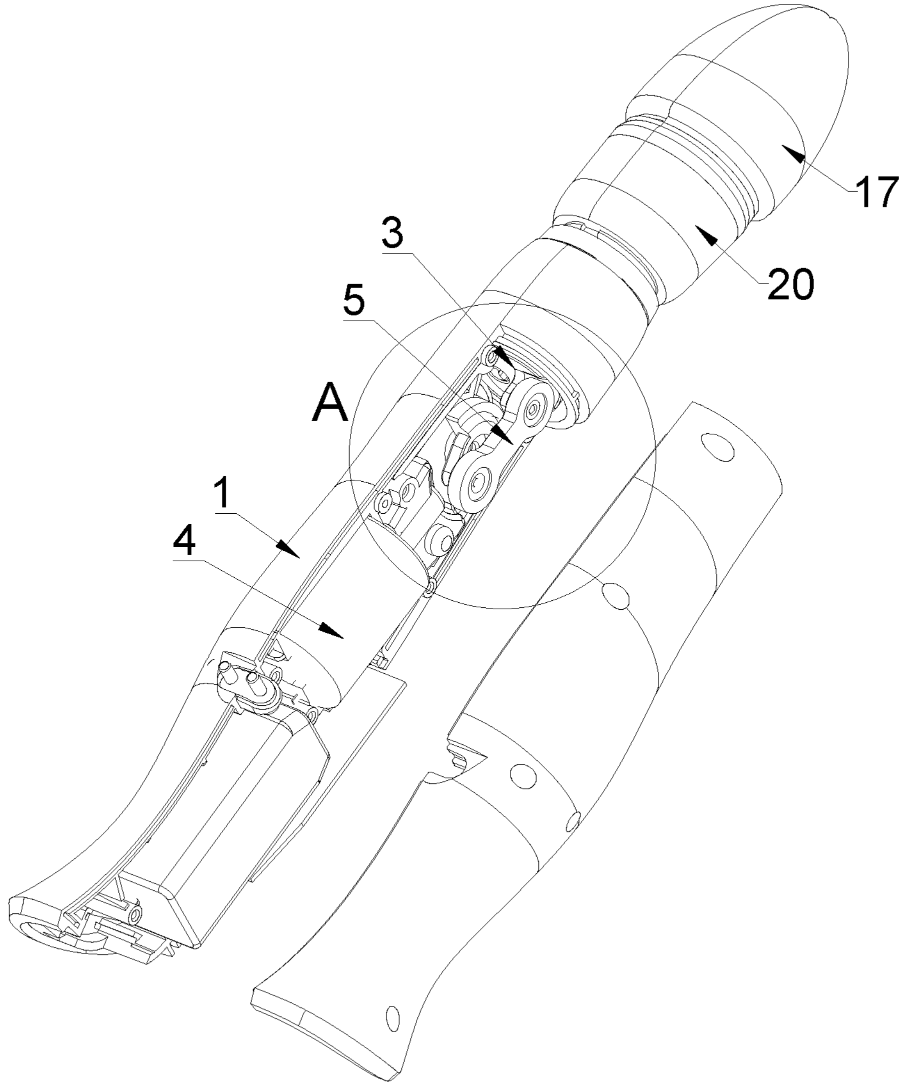
FIG. 2 is an exploded diagram of a hand-held massage machine provided by the present disclosure.
Figure 3:
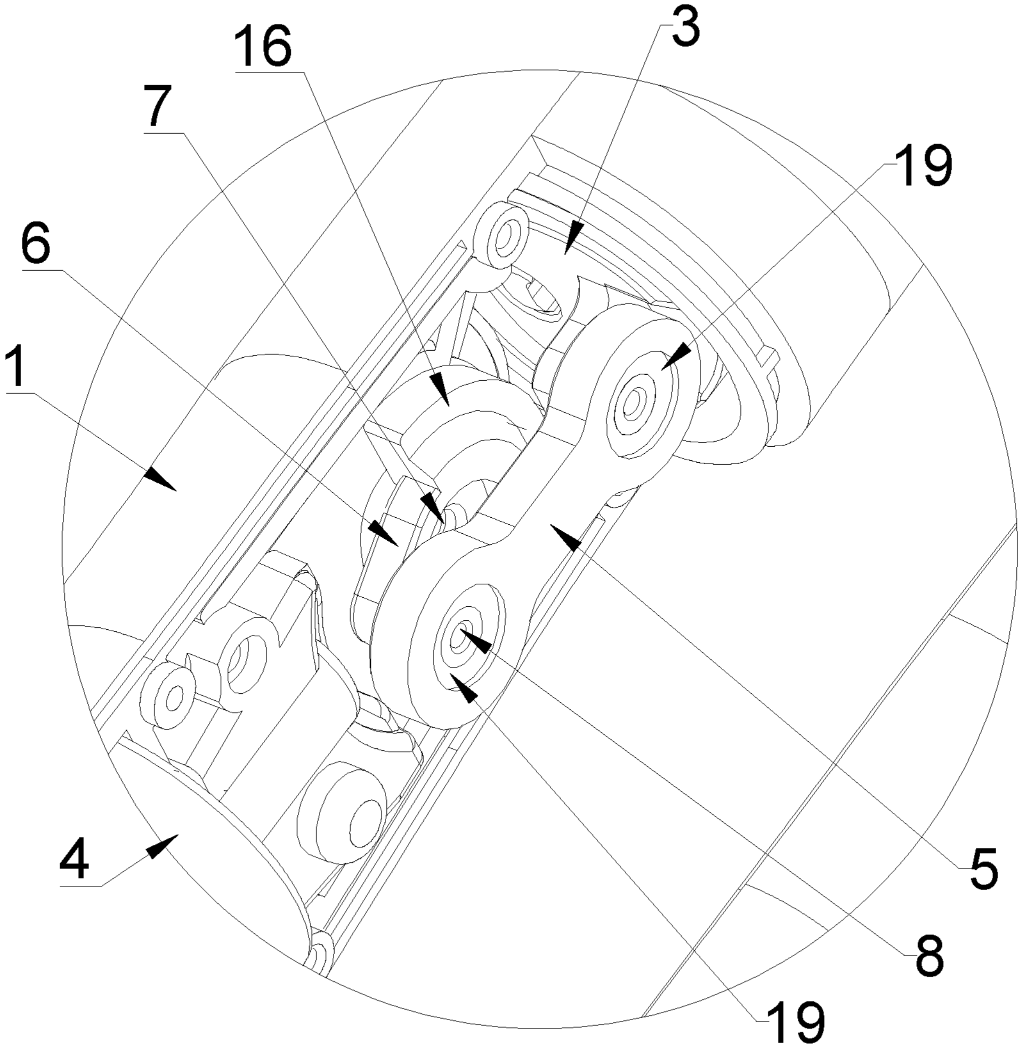
FIG. 3 is a partially enlarged diagram of portion A in FIG. 2.
Figure 4:
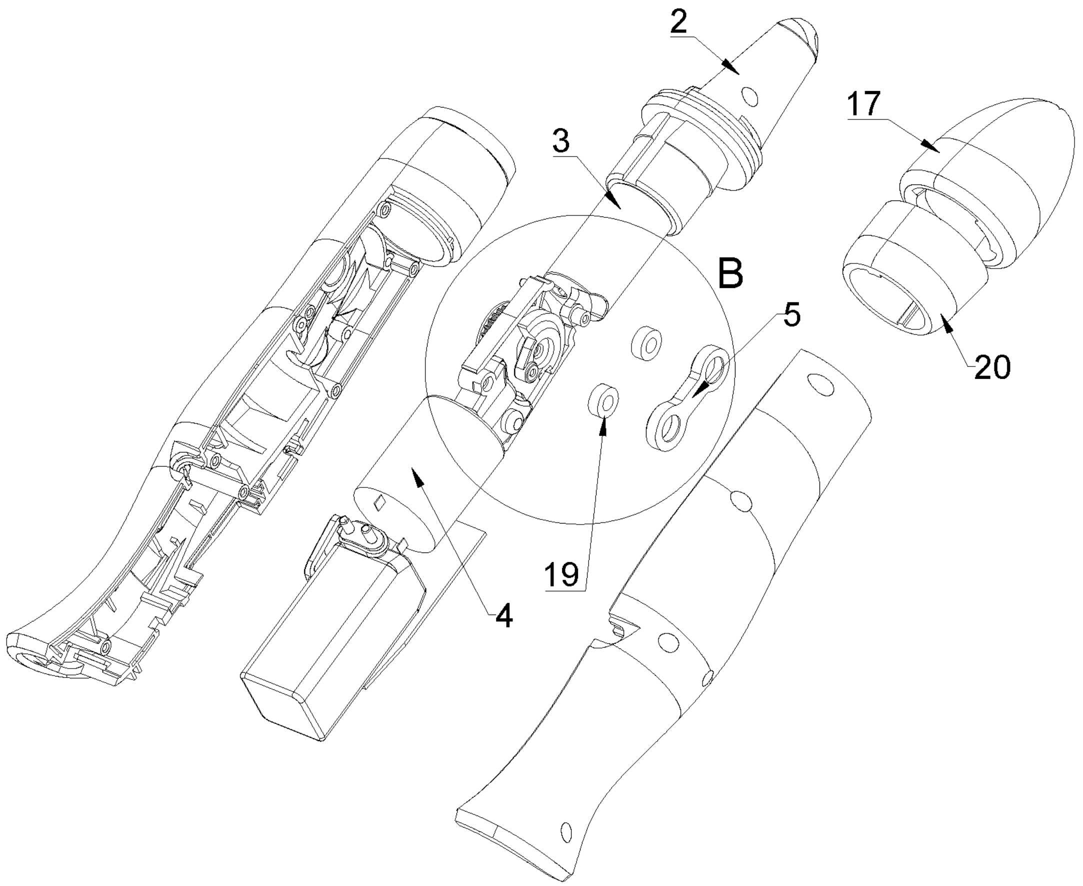
FIG. 4 is an exploded diagram during belt transmission of a transmission pair of a hand-held massage machine provided by the present disclosure.
Figure 5:
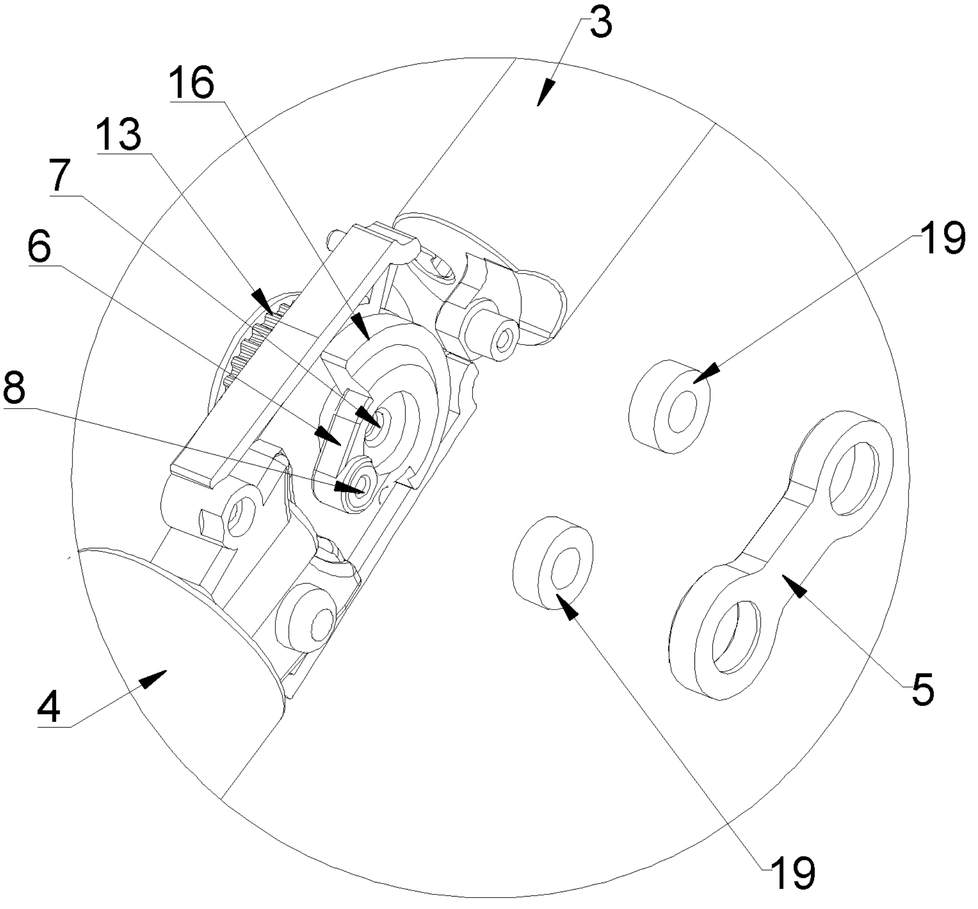
FIG. 5 is a partially enlarged diagram of portion B in FIG. 4.

1—handle; 2—massage unit; 3—telescopic shaft; 4—power source; 5—connecting rod; 6—rotating block; 7—rotating shaft; 8—hinge shaft; 9—worm wheel; 10—worm; 11—circular shaft; 12—driving pulley; 13—driven pulley; 14—driving gear; 15—driven gear; 16—counterweight portion; 17—soft rubber sleeve; 18—vibration motor; 19—bearing; and 20—soft rubber sheath.

DETAILED DESCRIPTION OF THE EMBODIMENTS

To make the objectives, technical solutions, and advantages of the present disclosure clearer, the technical solutions of the present disclosure will be described in detail below. Apparently, the examples described are merely some examples rather than all examples of the present disclosure. Based on the examples of the present disclosure, all other embodiments obtained by those of ordinary skill in the art without making creative efforts fall within the scope of protection of the present disclosure.

Example 1

As shown in FIGS. 1-9, a hand-held massage machine provided by the present disclosure includes a handle 1, a massage unit 2, a power source 4, a transmission mechanism and a counterweight portion 16, where the massage unit 2 is mounted on the handle 1 by means of a telescopic shaft 3, the power source 4 is mounted in the handle 1, and the transmission mechanism is in transmission connection between the power source 4 and the telescopic shaft 3. The transmission mechanism is used for transmitting power of the power source 4 to the telescopic shaft 3 to drive the telescopic shaft 3 to drive the massage unit 2 to stretch out and draw back on the handle 1, the counterweight portion 16 is mounted on the transmission mechanism, and the counterweight portion 16 is linked to the transmission mechanism, such that force output by the transmission mechanism to the telescopic shaft 3 is increased. Alternatively, the power source 4 in this example is of a telescopic motor, and the telescopic motor is an electric motor may output rotation. Certainly, a battery and a circuit board are further mounted in the handle 1, the circuit board is electrically connected to the battery and the telescopic motor, the circuit board is further electrically connected to a switch, and the switch controls the telescopic motor to be powered on and off. When the telescopic motor is powered on, the telescopic motor outputs rotating power, and the transmission mechanism converts the rotating power and then transmits the converted rotating power to the telescopic shaft 3 to drive the telescopic shaft 3 to stretch out and draw back on the handle 1. Specifically, one end of the handle 1 is provided with a telescopic channel adapted to the telescopic shaft 3, and the telescopic shaft 3 is slidably inserted into the telescopic channel, such that the telescopic shaft 3 stably stretches out and draws back on the handle 1.

In the above structure, weight reduction processing is performed on the massage unit serving as a massage functional component, and moreover, an independent counterweight component separated from the massage unit is arranged, such that separation optimization of the overall counterweight of a system is achieved, and the advantage of large inertia of the system is maintained. As an important energy storage parameter of motion impact massage, the counterweight has a great influence on the massage effect, and if the counterweight is excessively reduced to achieve an effect of optimizing reciprocating control, property deterioration, namely insufficient impact force, may be caused during massage. As an auxiliary understanding, if the inertial configuration of a moving component is insufficient, the driving motor may bear large impact force when the massage unit encounters a massage load, damage impact is caused to a circuit system, a service life of an electrical element and a service life of the circuit system may be shortened due to continuous load impact, and the overall safety of the system may also be reduced.

Specifically, in the above structure, the transmission mechanism is in transmission connection between the power source 4 and the telescopic shaft 3, such that the power source 4 drives the transmission mechanism to operate. The counterweight portion 16 is mounted on the transmission mechanism, and the transmission mechanism is linked to the counterweight portion 16, such that when the transmission mechanism operates, the counterweight portion 16 may also be driven to act synchronously to be separated from the massage unit. The counterweight portion 16 equivalently compensates reduction of the motion inertia of the massage unit, and the balance of the total motion inertia of the motion system is achieved, such that after the counterweight portion 16 is additionally mounted in the hand-held massage machine provided by the present disclosure, the transmission mechanism and the counterweight portion 16 synchronously output energy to the telescopic shaft 3 during operation, the energy obtained by the telescopic shaft 3 in unit time is larger, the corresponding force/impact force of the telescopic shaft 3 when encountering the load/resistance during a telescopic process is larger, and the telescopic force of the massage unit 2 is also larger. When the massage unit 2 applies massage to the human body, due to the fact that the massage unit 2 may stretch out and draw back with larger force, the scale and the generation probability of lateral deviation of the massage unit 2 and the telescopic shaft 3 in the telescopic process are smaller, such that vibration and noise generated due to lateral deviation in the telescopic process of the massage unit 2 are reduced.

Moreover, compared with original reciprocating motion of a heavier massage unit, a combination of a lighter massage unit and the relatively light compensation counterweight achieves higher total motion inertia while reducing the impact between components of the transmission system. Specifically, reversing of the heavier massage unit is the main source of the impact of the transmission system, and the solution of the present application is equivalent to changing the relatively concentrated mass distribution to the balanced distribution on a link of the transmission system, such that the impact between the components is reduced obviously, and the noise is reduced.

In addition, due to the fact that the noise of the system is reduced from the source, sound insulation and vibration absorption requirements of the massage unit are reduced, and implementation of the dual-effect massage output of reciprocating motion and vibration by arranging the vibration motor at an end of the massage unit become possible.

In order to explain the description more clearly, in this example, a stretching direction of the telescopic shaft 3 and the massage unit 2 is defined to be leftward, and when the counterweight portion 16 is not added, the stretching force obtained from the transmission mechanism by the telescopic shaft 3 and the massage unit 2 is A, and when the massage unit 2 is not in contact with an external object, the total stress applied to the massage unit 2 and the telescopic shaft 3 during stretching is A. When the massage unit 2 applies massage to the human body, the massage unit 2 is in contact with the human body, in this case, the human body will apply counter-acting force (i.e. rightward acting force) to the massage unit 2, and the counter-acting force is defined as B, and therefore, in this case, the total stress applied to the massage unit 2 and the telescopic shaft 3 during stretching is A-B. When the total stress applied to the massage unit 2 and the telescopic shaft 3 during stretching is A, the massage unit 2 and the telescopic shaft 3 may stretch along the design path, and in this case, the scale and the generation probability of lateral deviation of the massage unit 2 and the telescopic shaft 3 are very small, which may be almost ignored. However, when the total stress applied to the massage unit 2 and the telescopic shaft 3 during stretching is A-B, the stretching force of the massage unit 2 and the telescopic shaft 3 is insufficient, such that the massage unit 2 and the telescopic shaft 3 may generate large-scale lateral deviation.

The counterweight portion 16 is additionally mounted on the transmission mechanism of the hand-held massage machine provided by the present disclosure, such that mass of the whole transmission mechanism is larger. After the power source 4 (namely the telescopic motor) drives the transmission mechanism to reach an operation speed, due to the large mass of the transmission mechanism, energy carried by the transmission mechanism is also larger, such that the force output by the transmission mechanism to the telescopic shaft 3 is also larger. The force transmitted by the transmission mechanism and applied to the telescopic shaft 3 during stretching in this case is defined as C, and it may be known from the above analysis that C>A. When the massage unit 2 applies massage to the human body, the total stress applied to the massage unit 2 and the telescopic shaft 3 during stretching is C-B, and since C>A, C-B>A-B. It may be seen therefrom that after the counterweight portion 16 is additionally mounted, the total stress applied to the massage unit 2 and the telescopic shaft 3 during stretching is larger than that when the counterweight portion 16 is not additionally mounted, such that the scale and the generation probability of lateral deviation of the massage unit 2 and the telescopic shaft 3 in the telescopic process are smaller.

As an alternative embodiment of this example, a weight ratio of the counterweight portion 16 to the massage unit 2 in this example is n:1, where $0.6 \le n \le 2$. Preferably, $1 \le n \le 2$. Optimally, n=1.5. Certainly, the value of n may also be 0.6, 0.7, 0.8, 0.9, 1, 1.1, 1.2, 1.3, 1.4, 1.6, 1.7, 1.8, 1.9, 2, etc. It should be noted that the massage unit 2 in this example includes a housing and a vibration motor 18 mounted inside the housing, and the vibration motor 18 is also electrically connected to the circuit board, such that the circuit board is used for supplying power to the vibration motor 18, and the switch controls the vibration motor 18 to be started and stopped. Specifically, when the vibration motor 18 and the telescopic motor are started and stopped at the same time, that is, when the telescopic motor is started, the vibration motor 18 is also started, and when the telescopic motor is stopped, the vibration motor 18 is also stopped.

It is found from the above example that as the weight ratio changes, a noise parameter and load impact resistance of the system also change significantly. When the parameter n is set to be 1.5-2, noise performance between the transmission components in the system is relatively excellent. In this case, when the vibration motor is arranged inside the massage unit, the vibration output is strong, and therefore, two massage effects of vibration and reciprocating stretching are optimized at the same time.

Alternatively, the massage unit 2 is provided with a soft rubber sleeve 17 in a sleeving manner, such that a touch feeling of the massage unit 2 is more comfortable. When the massage unit 2 applies massage to the human body, the soft rubber sleeve 17 is cushioned between the massage unit 2 and the human body, and therefore, the overall comfort of the massage machine is obviously improved. In this example, the total weight of the massage unit 2 is approximately equal to the sum of those of the housing, the vibration motor 18, and the soft rubber sleeve 17.

Alternatively, the telescopic shaft 3 in this example includes a built-in section inserted into the telescopic channel and an external section located outside the handle 1, and the massage unit 2 is connected to a free end of the external section. A soft rubber sheath 20 is further arranged outside the external section of the massage unit 2 in a sleeving manner, such that the hand-held massage machine provided by this example is more attractive and has more comfortable outer wall touch. The soft rubber sheath 20 may also absorb part of vibration, thereby further reducing the noise generated during operation of the hand-held massage machine.

An alternative embodiment of this example is as follows: as shown in FIGS. 2-5, the transmission mechanism in this example includes a connecting rod 5, a rotating block 6, and a speed reduction assembly, where the connecting rod 5 is a straight rod, two circular holes are provided in the connecting rod 5, bearings 19 are mounted in the two circular holes, a circular boss is connected to the telescopic shaft 3, and the bearing 19 in one circular hole is arranged on the circular boss in a sleeving manner, such that one end of the connecting rod 5 is hinged to the telescopic shaft 3.

The rotating block 6 is a block body and is rotationally mounted inside the handle 1 by means of a rotating shaft 7. Since when the hand-held massage machine operates, the rotating block 6 rotates, a hinge shaft 8 is fixedly arranged on the rotating block 6, the hinge shaft 8 is eccentrically arranged with relative to the rotating shaft 7, and the bearing 19 in the other circular hole in the connecting rod 5 is arranged on the hinge shaft 8 in a sleeving manner, such that the other end of the connecting rod 5 is hinged to the rotating block 6 by means of the hinge shaft 8.

In this way, the connecting rod 5 and the rotating block 6 form a crank and connecting rod 5 mechanism, and when the rotating block 6 rotates, the connecting rod 5 drives the telescopic shaft 3 to stretch out and draw back on the handle 1.

The speed reduction assembly is in transmission connection between the power source 4 and the rotating block 6, such that the rotating motion output by the power source 4 is decelerated and then transmitted to the rotating block 6 for driving the rotating block 6 to rotate around the rotating shaft 7 in the handle 1. Since the rotating speed of rotation output by the telescopic motor is relatively large, the rotation is decelerated by the speed reduction assembly and then is transmitted to the rotating block 6 so as to make the rotating block 6 to rotate at an appropriate rotating speed.

The counterweight portion 16 is fixedly connected to the rotating block 6, thereby increasing the weight of the rotating block 6. When the speed reduction assembly drives the rotating block 6 to rotate at a rated rotating speed, the mass of the rotating block 6 added with the counterweight portion 16 is larger, such that the weight of a rotating component composed of the rotating block 6 and the counterweight portion 16 is larger than that of an independent rotating block 6, the force transmitted to the connecting rod 5 by the rotating component is larger, and the telescopic force transmitted to the telescopic shaft 3 by the connecting rod 5 is larger.

The manner of driving the counterweight by using the rotating block has a positive effect, which is adapted to the rotational motion of the driving motor in a rotating process, and does not impact an output shaft of the driving motor due to reciprocating motion of the massage unit. Specifically, when the value range of the parameter n is 1.5-2, a reciprocating impact effect of the massage unit is basically absorbed when the reciprocating impact effect of the massage unit is transmitted to the rotating block through the transmission system, and a control system of the driving motor is almost in a protection level of an isolation state.

Specifically, the counterweight portion 16 and the rotating block 6 in this example are integrally formed, and certainly, the counterweight portion 16 may also be fixedly connected to the rotating block 6 in a welded manner. Moreover, the counterweight portion 16 and the hinge shaft 8 are located on two sides of the rotating shaft 7 respectively.

The positive effects of this example are at least as follows: there is relatively large rotational inertia when the counterweight rotates, and the rotational inertia provides the hand-held massage machine with relatively strong overall stability, thereby improving the usage experience of the massage machine.

As another embodiment of this example, the counterweight portion 16 in this example may also be additionally mounted on the connecting rod 5 to increase the weight of the connecting rod 5. As another embodiment of this example, the counterweight portion 16 in this example may also be additionally mounted on the rotating shaft 7 to increase the weight of the rotating shaft 7.

An alternative embodiment of this example is as follows: the speed reduction assembly in this example includes a worm wheel 9, a worm 10, and a transmission pair, where the worm wheel 9 is rotationally mounted inside the handle 1 by means of a circular shaft 11, the worm 10 is connected to a power output end of the power source 4 (i.e. a stretching shaft of the telescopic motor), and the worm wheel 9 is meshed with the worm 10 to form a worm wheel and worm transmission member. The rotation output by the telescopic motor is decelerated by the worm wheel and worm transmission member and then transmitted to the circular shaft 11. The worm wheel and worm transmission member has a better speed reduction effect. As another embodiment of this example, the counterweight portion 16 in this example may also be additionally mounted on the circular shaft 11 to increase the weight of the circular shaft 11.

The transmission pair is in transmission connection between the circular shaft 11 and the rotating shaft 7, such that rotation of the circular shaft 11 is transmitted to the rotating shaft 7 by means of the transmission pair, thereby driving the rotating shaft 7 to drive the rotating block 6 to rotate.

Figure 6:
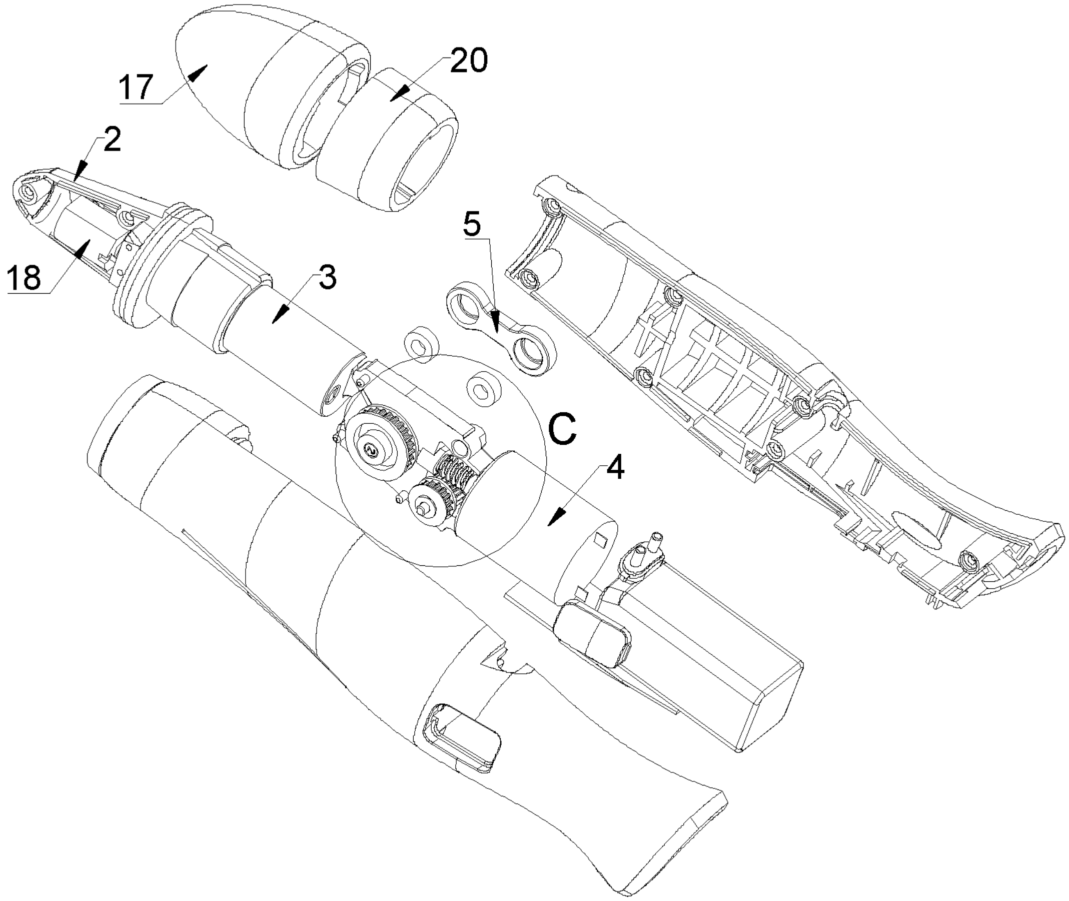
FIG. 6 is a diagram from another view of the structure shown in FIG. 4.
Figure 7:
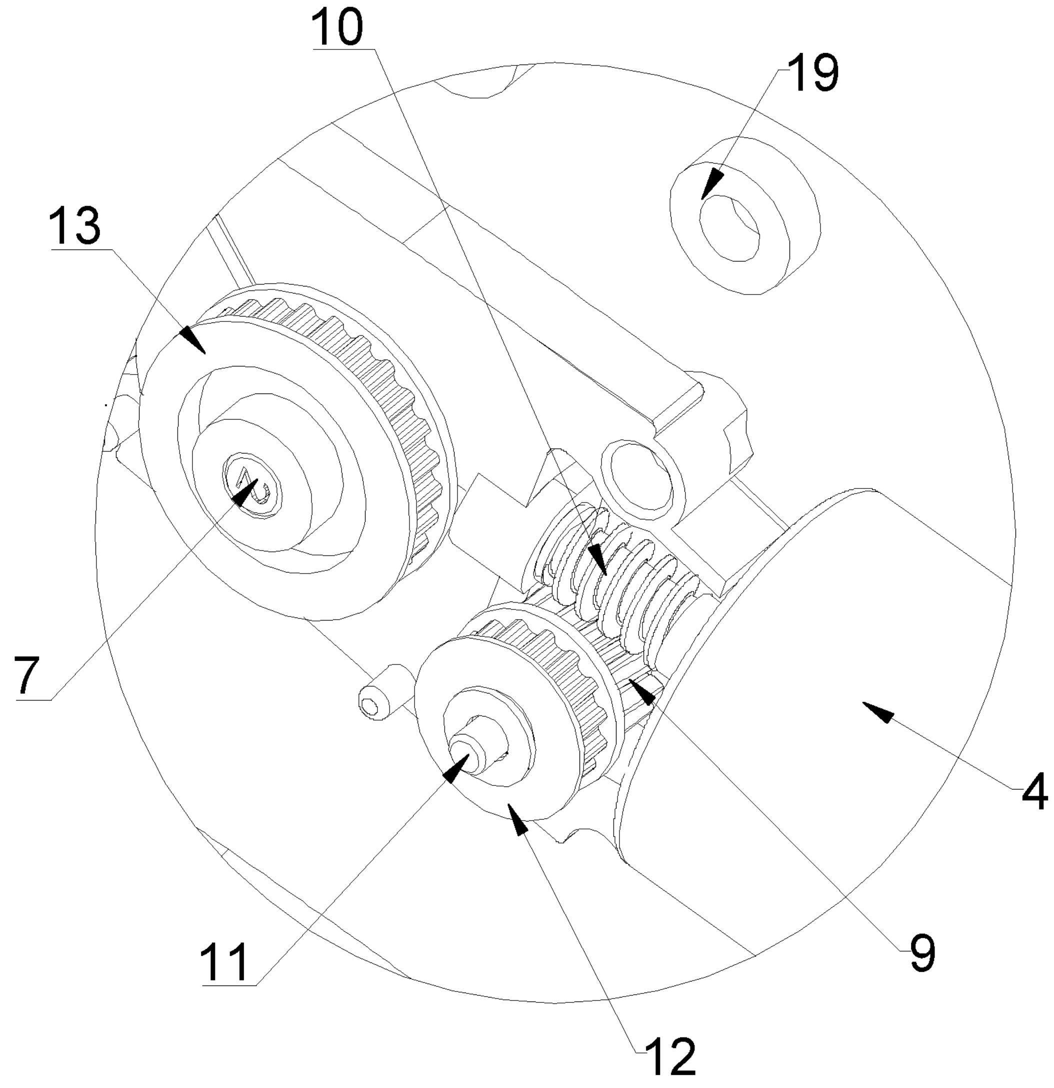
FIG. 7 is a partially enlarged diagram of portion C in FIG. 6.

An alternative embodiment of this example is as follows: as shown in FIG. 6 and FIG. 7, the transmission pair in this example includes a driving pulley 12, a driven pulley 13, and a belt (not shown in the figure), where the driving pulley 12 is mounted on the circular shaft 11 and rotates synchronously with the circular shaft 11. The driven pulley 13 is mounted on the rotating shaft 7, and the rotating shaft 7 rotates synchronously with the driven pulley 13. The belt is wound between the driving pulley 12 and the driven pulley 13, such that the driving pulley 12 and the driven pulley 13 are connected by means of the belt to form belt transmission. In this way, when the circular shaft 11 drives the driving pulley 12 to rotate, the driving pulley 12 drives the driven pulley 13 to rotate synchronously through the belt, thereby driving the rotating shaft 7 and the rotating block 6 to rotate.

Alternatively, when a diameter of the driving pulley 12 in this example is less than a diameter of the driven pulley 13. As another embodiment of this example, the counterweight portion 16 in this example may also be mounted on the driving pulley 12 or the driven pulley 13 to increase the weight of the driving pulley 12 or the driven pulley 13. Certainly, in this case, the counterweight portion 16 needs to be coaxial with the driving pulley 12 or the driven pulley 13 so as to avoid from damaging the dynamic balance when the driving pulley 12 and the driven pulley 13 rotate.

Since vibration may be generated when the telescopic motor operates, part of such vibration is transmitted to the worm wheel 9 by means of the worm 10, then is transmitted to the circular shaft 11 by means of the worm wheel 9, and finally is transmitted to the driving pulley 12 by means of the circular shaft 11. Due to good elasticity and flexibility of the belt, connection between the belt and the driving pulley 12 belongs to flexible connection, and therefore, the belt may absorb the vibration of the driving pulley 12, the vibration of the circular shaft 11 is no longer transmitted to the driven pulley 13, the rotating shaft 7, the rotating block 6, the connecting rod 5 and the telescopic shaft 3, thereby further reducing vibration and noise generated by the telescopic shaft 3 and the handle 1 during operation of the hand-held massage machine provided in this example.

In addition, the rotating block 6 drives the telescopic shaft 3 and the massage unit 2 to stretch out and draw back by means of the connecting rod 5. It is assumed that the counter-acting force applied by the massage unit 2 and the telescopic shaft 3 during stretching to the connecting rod 5 and the rotating block 6 is leftward, and the counter-acting force applied by the massage unit 2 and the telescopic shaft 3 during drawing back to the connecting rod 5 and the rotating block 6 is rightward. Since directions of such two acting force are opposite, when a telescopic direction suddenly changes, the counter-acting force applied to the rotating block 6 and the connecting rod 5 may also have a sudden change process. Sudden change of the acting force may make the total stress of the rotating block 6, the circular shaft 11 and the driven pulley 13 change, and therefore, the rotating component composed of the rotating block 6, the circular shaft 11 and the driven pulley 13 may generate a shake. However, since the driven pulley 13 is connected to the belt, the belt may absorb the shake, such that the shake fails to be transmitted to the driving pulley 12. Thus, the rotation of the circular shaft 11 is transmitted to the rotating shaft 7 by using belt transmission, such that vibration and noise generated by the telescopic shaft 3 and the handle 1 may be further reduced. In addition, the worm and worm wheel transmission manner is applied from an output shaft of the motor to a load end, and at least one beneficial effect of application to this example of such a manner is as follows: impact from the load end may be completely blocked by the worm wheel and worm transmission structure so as to achieve real isolation protection of the driving motor. It should be noted that such protection is conducive to the noise optimization of the system, because the driving motor is a moving body with large work difference between various components, and the collision noise caused by the impact feedback to the motor end may be amplified in the process of high-speed rotation of the motor, resulting in large noise in the use of the motor. The worm wheel and the worm achieve stable and controllable output of the motor, and prolong service lives of the motor and the control system while reducing noise.

Figure 8:
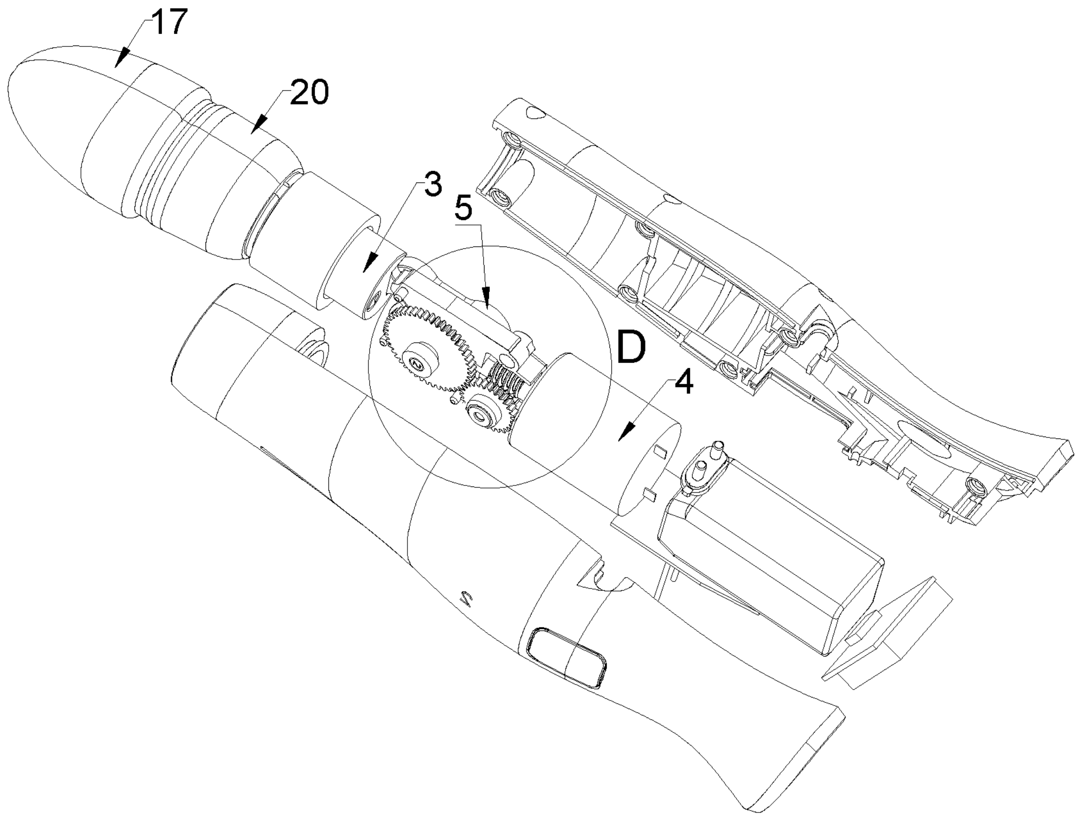
FIG. 8 is an exploded diagram during gear transmission of a transmission pair of a hand-held massage machine provided by the present disclosure.
Figure 9:
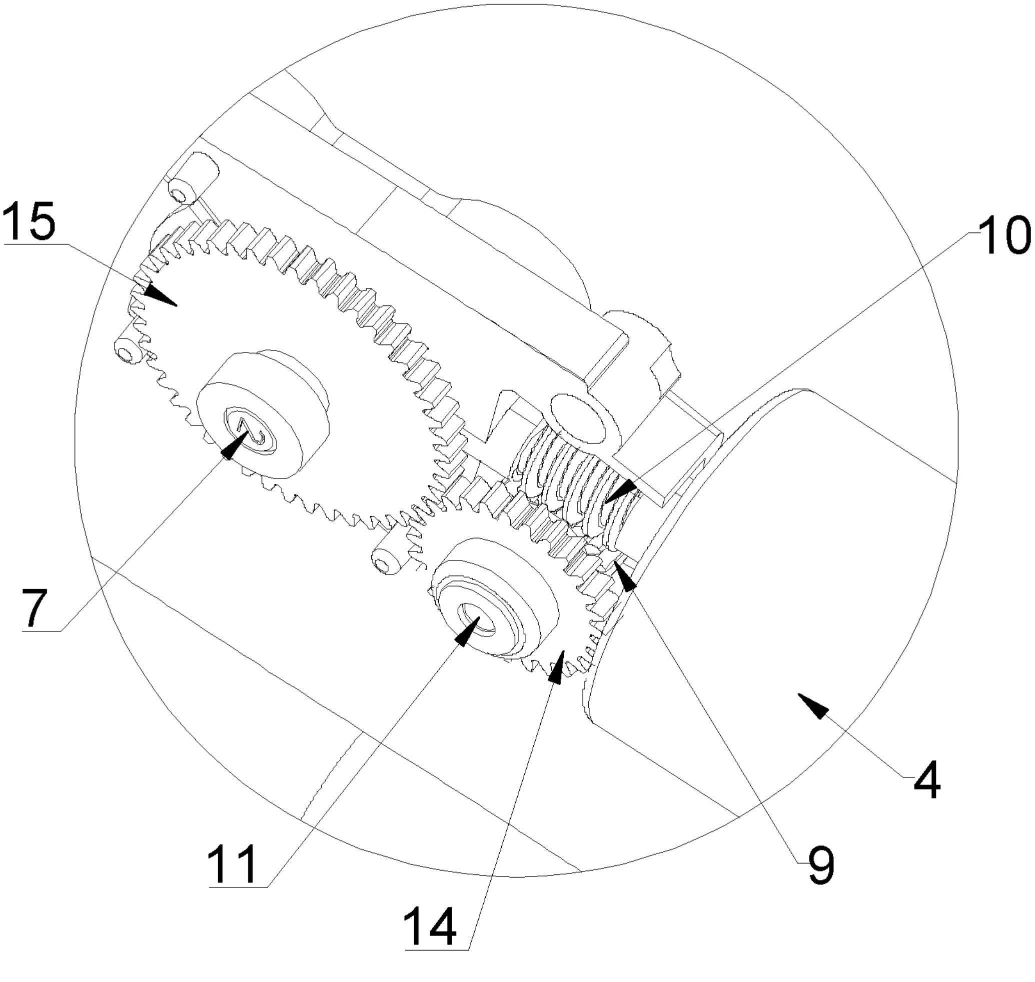
FIG. 9 is a partially enlarged diagram of portion D in FIG. 8.

Another alternative embodiment of this example is as follows: as shown in FIG. 8 and FIG. 9, the transmission pair in this example includes a driving gear 14 and a driven gear 15, and the driving gear 14 is mounted on the circular shaft 11 and rotates synchronously with the circular shaft 11. The driven gear 15 is mounted on the rotating shaft 7, and the rotating shaft 7 rotates synchronously with the driven gear 15. The driven gear 15 is meshed with the driving gear 14 to form gear transmission. In this way, when the circular shaft 11 rotates, rotation is transmitted to the rotating shaft 7 by means of gear transmission. As another embodiment of this example, the counterweight portion 16 in this example may also be mounted on the driving gear 14 or the driven gear 15 to increase the weight of the driving gear 14 or the driven gear 15. Certainly, in this case, the counterweight portion 16 needs to be coaxial with the driving gear 14 or the driven gear 15 so as to avoid from damaging the dynamic balance when the driving gear 14 and the driven gear 15 rotate.

However, there is an assembly gap at a meshing position between the driving gear 14 and the driven gear 15, and when the telescopic direction suddenly changes, the counter-acting force borne by the rotating block 6 and the connecting rod 5 may have a sudden change process. Sudden change of the acting force may make the total stress of the rotating block 6, the circular shaft 11 and the driven gear 15 change, such that the rotating component composed of the rotating block 6, the circular shaft 11 and the driven gear 15 may generate a shake, and such a shake causes a width of the assembly gap to change, thereby generating impact or rubbing at the meshing position between the driving gear 14 and the driven gear 15, and generating additional vibration and noise. Based on the above reasons, the optimal embodiment of the hand-held massage machine provided in this example is to use belt transmission as the transmission pair.

The foregoing description, merely being particular embodiments of the present disclosure, is not intended to limit the protection scope of the present disclosure, and any changes or substitutions, that may readily occur to those skilled in the art, within the scope of technology recorded in the present disclosure are intended to be encompassed within the protection scope of the present disclosure. Therefore, the protection scope of the present disclosure should be subject to a protection scope of the claims.

What is claimed is:

1. A hand-held massage machine, comprising:

a handle;

a massage unit mounted on the handle by means of a telescopic shaft;

a power source mounted in the handle; and a transmission mechanism being in transmission connection between the power source and the telescopic shaft so as to drive the telescopic shaft to stretch out and draw back on the handle, wherein the transmission mechanism is provided with a counterweight portion, and the counterweight portion is linked to the transmission mechanism;

wherein the transmission mechanism comprises:

a connecting rod, one end of which is hinged to the telescopic shaft;

a rotating block being rotationally mounted inside the handle by means of a rotating shaft, the rotating block being provided with a hinge shaft, the hinge shaft being eccentrically arranged with relative to the rotating shaft, and the other end of the connecting rod being hinged to the rotating block by means of the hinge shaft; and a speed reduction assembly being in transmission connection between the power source and the rotating block so as to drive the rotating block to rotate around the rotating shaft, wherein the counterweight portion is fixedly connected to the rotating block;

wherein the counterweight portion and the rotating block are integrally formed, and the counterweight portion and the hinge shaft are located on two sides of the rotating shaft respectively wherein the speed reduction assembly comprises:

a worm wheel rotationally mounted inside the handle by means of a circular shaft;

a worm connected to a power output end of the power source, wherein the worm wheel is meshed with the worm; and a transmission pair, wherein the transmission pair comprises: a driving transmission member mounted on the circular shaft; and a driven transmission member mounted on the rotating shaft, wherein the driven transmission member is meshed or otherwise in transmission connection with the driving transmission member.

2. The hand-held massage machine according to claim 1, wherein the transmission pair comprises:

a driving pulley mounted on the circular shaft;

a driven pulley mounted on the rotating shaft; and a belt connected between the driving pulley and the driven pulley, wherein the belt, the driving pulley and the driven pulley form belt transmission.

3. The hand-held massage machine according to claim 1, wherein the transmission pair comprises:

a driving gear mounted on the circular shaft; and a driven gear mounted on the rotating shaft, wherein the driven gear is meshed with the driving gear.

4. The hand-held massage machine according to claim 1, wherein a weight ratio of the counterweight portion to the massage unit is n:1, wherein $0.6 \leq n \leq 2$.

5. The hand-held massage machine according to claim 1, wherein a weight ratio of the counterweight portion to the massage unit is n:1, wherein $0.6 \leq n \leq 2$.

6. The hand-held massage machine according to claim 1, wherein a weight ratio of the counterweight portion to the massage unit is n:1, wherein $0.6 \leq n \leq 2$.

7. The hand-held massage machine according to claim 2, wherein a weight ratio of the counterweight portion to the massage unit is n:1, wherein $0.6 \leq n \leq 2$.

8. The hand-held massage machine according to claim 3, wherein a weight ratio of the counterweight portion to the massage unit is n:1, wherein $0.6 \leq n \leq 2$.

9. The hand-held massage machine according to claim 1, wherein a weight ratio of the counterweight portion to the massage unit is n:1, wherein $1 \leq n \leq 2$.

10. The hand-held massage machine according to claim 2, wherein a weight ratio of the counterweight portion to the massage unit is n:1, wherein $1 \leq n \leq 2$.

11. The hand-held massage machine according to claim 4, wherein a weight ratio of the counterweight portion to the massage unit is n:1, wherein $1 \leq n \leq 2$.

12. The hand-held massage machine according to claim 2, wherein a weight ratio of the counterweight portion to the massage unit is n:1, wherein $1 \leq n \leq 2$.

13. The hand-held massage machine according to claim 3, wherein a weight ratio of the counterweight portion to the massage unit is n:1, wherein $1 \leq n \leq 2$.

14. The hand-held massage machine according to claim 1, wherein a weight ratio of the counterweight portion to the massage unit is n:1, wherein n=1.5.

15. The hand-held massage machine according to claim 1, wherein the massage unit is provided with a soft rubber sleeve in a sleeving manner.

* * * * *